(12) United States Patent
Takamiya et al.

(10) Patent No.: US 7,770,558 B2
(45) Date of Patent: Aug. 10, 2010

(54) INTAKE AIR CONTROL SYSTEM FOR INTERNAL COMBUSTION ENGINE

(75) Inventors: Hideharu Takamiya, Wako (JP); Isao Komoriya, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 276 days.

(21) Appl. No.: 12/010,175

(22) Filed: Jan. 22, 2008

(65) Prior Publication Data
US 2008/0183370 A1 Jul. 31, 2008

(30) Foreign Application Priority Data
Jan. 26, 2007 (JP) ............... 2007-016889

(51) Int. Cl.
*F02D 13/00* (2006.01)
*F02D 13/04* (2006.01)
(52) U.S. Cl. ............ 123/346; 123/321; 123/90.15
(58) Field of Classification Search ............ 123/321, 123/322, 345, 346, 347, 348, 90.15
See application file for complete search history.

(56) References Cited

U.S. PATENT DOCUMENTS

2005/0178357 A1  8/2005  Yui et al.

FOREIGN PATENT DOCUMENTS

| DE | 198 59 018 A1 | 6/2000 |
|---|---|---|
| DE | 103 03 252 A1 | 8/2003 |
| EP | 1 188 916 A2 | 3/2002 |
| EP | 1 234 967 A2 | 8/2002 |
| JP | 2005-171793 | 6/2005 |
| JP | 2005/232992 | 9/2005 |
| JP | 2006/170096 | 6/2006 |
| WO | WO 2006/107118 A1 | 10/2006 |

OTHER PUBLICATIONS

European Search Report dated Apr. 29, 2008.

*Primary Examiner*—John T Kwon
(74) *Attorney, Agent, or Firm*—Squire, Sanders & Dempsey, LLP

(57) ABSTRACT

An intake air control system for an internal combustion engine having at least one intake valve and a valve operating characteristic varying mechanism which continuously varies a lift amount of the at least one intake valve of the engine. A target intake air flow rate of the engine is calculated along with a command value of the lift amount according to a target engine rotational speed set in an idling condition of the engine and the target intake air flow rate when the engine is determined to be in an idling condition. The valve operating characteristic varying mechanism is controlled according to the calculated lift amount command value.

3 Claims, 9 Drawing Sheets

INTAKE AIR CONTROL SYSTEM FOR INTERNAL COMBUSTION ENGINE

BACKGROUND OF THE INVENTION

1. Field of the Invention

The present invention relates to an intake air control system for an internal combustion engine, and particularly to an intake air control system for an internal combustion engine having a valve operating characteristic varying mechanism for continuously varying a lift amount of at least one intake valve of the engine.

2. Description of the Related Art

Japanese Patent Laid-open No. 2005-171793 (JP '793) discloses a control system for an internal combustion engine having a valve operating characteristic varying mechanism for continuously varying a lift amount of intake valves and an electronically-controlled throttle valve. According to the conventional system disclosed in JP '793, in an engine operating condition other than an idling condition and a high-load operating condition, an intake air amount of the engine is controlled by varying the lift amount of the intake valve (a valve operating angle). If the idling condition is detected, an opening degree of the throttle valve is feedback controlled, according to a deviation between a target rotational speed and a detected rotational speed. Further, with respect to the lift amount of the intake valves, a feedforward correction is performed according to an on/off (application/removal) state of external loads on the engine (e.g., a load for actuating auxiliaries or a load changed by the range shift of an automatic transmission).

In the above-described conventional system, control of the intake air amount by the intake valve is switched to the throttle valve when the engine operating condition shifts from an operating condition other than the idling condition to the idling condition. Therefore, there is a possibility that a torque shock may be caused by switching control between the intake and throttle valves.

Further in the above-described conventional system, the lift amount of the intake valves is immediately corrected in the increasing direction when the external load is applied. However, there is a possibility in the conventional system that an excessive correction is performed to fluctuate the engine rotational speed since the intake air amount rapidly changes by varying the intake valve lift amount, as described in JP '793.

SUMMARY OF THE INVENTION

The present invention was made by contemplating the above-described points, and an object of the invention is to provide an intake air control system for an internal combustion engine, which implements a smooth shift to the idling condition from an operating condition other than the idling condition, thereby stabilizing the engine rotation in the idling condition To attain the above-described object, the present invention provides an intake air control system for an internal combustion engine having at least one intake valve and a valve operating characteristic varying mechanism which continuously varies a lift amount of the at least one intake valve. The intake air control system includes an idling condition determiner, a target intake air flow rate calculator, a lift amount command value calculator, and a lift amount controller. The idling condition determiner determines an idling condition of the engine. The target intake air flow rate calculator calculates a target intake air flow rate (GAIRCMD) of the engine. The lift amount command value calculator calculates a command value (LFTCMD) of the lift amount according to a target engine rotational speed (NOBJ) set in the idling condition of the engine and the target intake air flow rate (GAIRCMD) when the engine is determined to be in the idling condition. The lift amount controller controls the valve operating characteristic varying mechanism according to the calculated lift amount command value (LFTCMD).

With the above-described structural configuration, when the engine is determined to be in the idling condition the command value of the lift amount of the intake valve is calculated according to the target engine rotational speed and the target intake air flow rate set for the idling condition. The valve operating characteristic varying mechanism is controlled according to the lift amount command value. That is, since control of the intake air flow rate in the idling condition is performed by varying the lift amount of the intake valve, there is no switching of control between the intake and throttle valves as is performed in the previously described conventional system. This aspect enables the engine to shift smoothly to the idling condition. Further, if the lift amount of the intake valve is varied according to the detected engine rotational speed, it is difficult to maintain the engine rotational speed of the target engine rotational speed. By calculating the lift amount command value according to the target engine rotational speed, the engine rotational speed in the idling condition is stably maintained at the target engine rotational speed.

Preferably, the intake air control system further includes an external load detector. The external load detector detects application and removal of an external load on the engine. The lift amount command value calculator increases or decreases the lift amount command value (LFTCMD) with a limited rate of change in the lift amount command value when the application or removal of the external load is detected.

With the above-described structural configuration, the lift amount command value is calculated with the limited rate of change in the lift amount command value when the application or the removal of the external load is detected. Therefore, the intake air amount does not rapidly increase or decrease, wherein the engine rotation is stabilized regardless of whether the external load is applied to the engine or removed therefrom.

DETAILED DESCRIPTION OF THE PREFERRED EMBODIMENTS

Preferred embodiments of the present invention will now be described with reference to the drawings.

Figure 1:
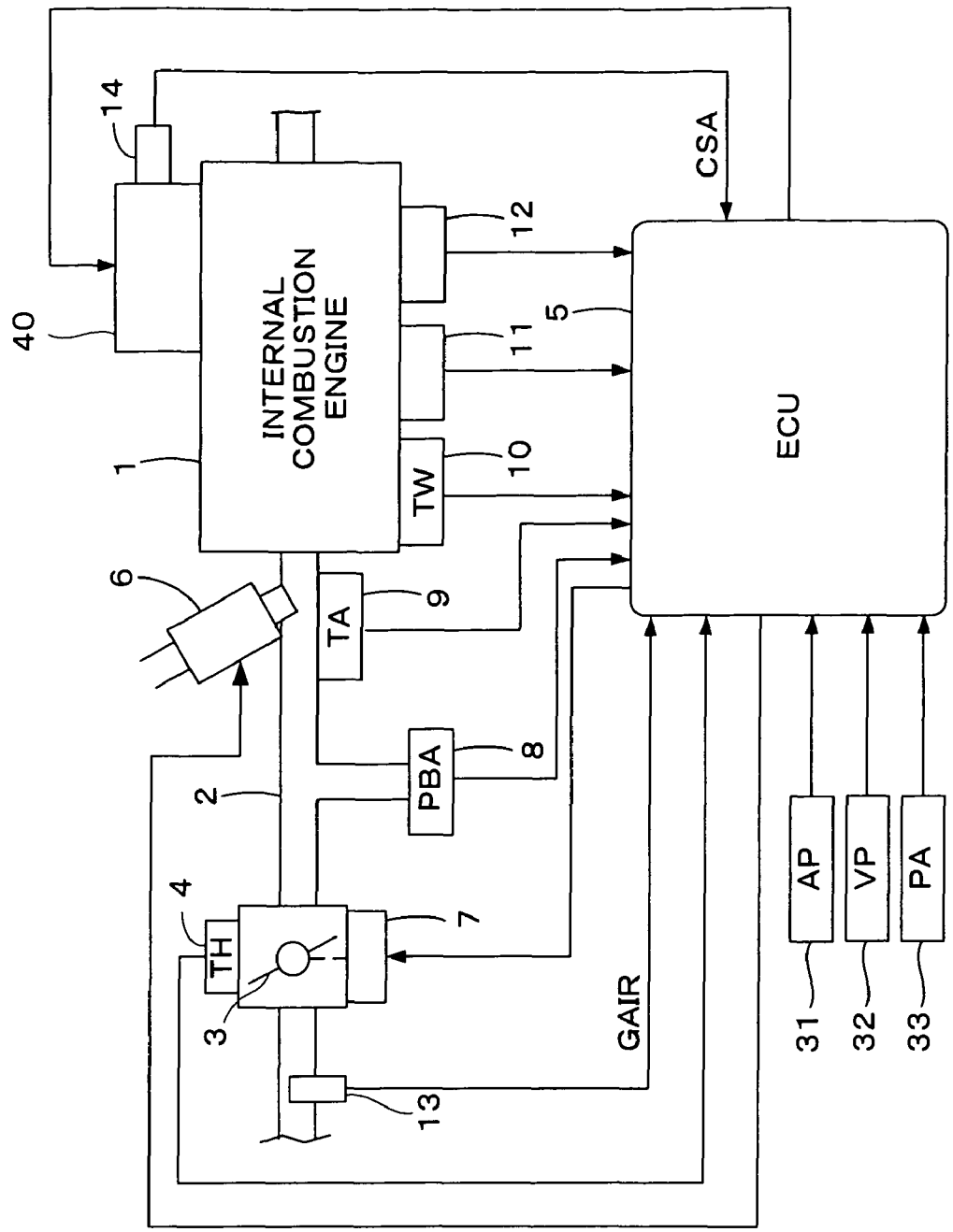
FIG. 1 is a schematic diagram of an internal combustion engine and a control system according to an embodiment of the present invention.
Figure 2:
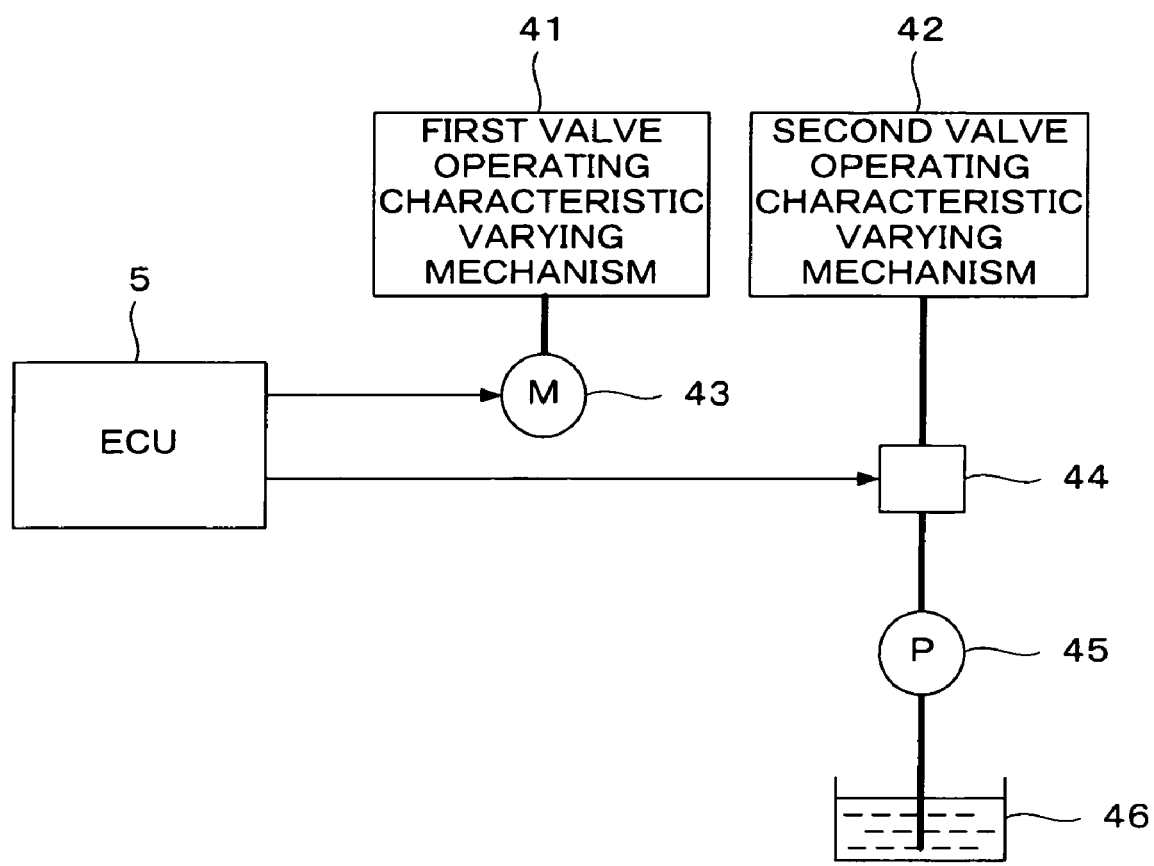
FIG. 2 is a schematic diagram of a valve operating characteristic varying device of the control system shown in FIG. 1.

FIG. 1 is a schematic diagram of an internal combustion engine and a control system according to an embodiment of the present invention, and FIG. 2 is a schematic diagram of a valve operating characteristic varying device. Referring to FIG. 1, an internal combustion engine 1 (hereinafter referred to as "engine"), having, for example, four cylinders, is provided with intake valves, exhaust valves, and cams for driving the intake valves and the exhaust valves. The engine 1 is provided with a valve operating characteristic varying device 40, having a first valve operating characteristic varying mechanism 41, and a second valve operating characteristic varying mechanism 42. The first valve operating characteristic varying mechanism 41 continuously varies the valve lift amount and the opening angle (valve opening period) of the intake valve. The second valve operating characteristic varying mechanism 42 is a cam phase varying mechanism for continuously varying the operating phases of the cams for driving the intake valves relative to a rotational angle of the crank shaft of the engine 1. The second valve operating characteristic varying mechanism 42 varies the operating phase of the cam for driving each intake valve, and consequently varies the operating phase of each intake valve.

The engine 1 has an intake pipe 2 provided with a throttle valve 3. A throttle valve opening (TH) sensor 4 is connected to the throttle valve 3 and outputs an electrical signal corresponding to an opening angle of the throttle valve 3 and supplies the electrical signal to an electronic control unit 5 (referred to as "ECU"). An actuator 7, which actuates the throttle valve 3, is connected to the throttle valve 3, and operation of the actuator 7 is controlled by the ECU 5.

Fuel injection valves 6 are inserted into the intake pipe 2 at locations between the cylinder block of the engine 1 and the throttle valve 3 and slightly upstream of the respective intake valves (not shown). The fuel injection valves 6 are connected to a fuel pump (not shown), and are electrically connected to the ECU 5. A valve opening period of each fuel injection valve 6 is controlled by a signal output from the ECU 5.

An intake pressure sensor 8 which detects an intake pressure PBA, and an intake air temperature sensor 9, which detects an intake air temperature TA, are disposed downstream of the throttle valve 3. Further, an engine coolant temperature sensor 10, which detects an engine coolant temperature TW, is mounted on the body of the engine 1. The detection signals from the sensors 8-10 are supplied to the ECU 5.

A crank angle position sensor 11 and a cam angle position sensor 12 are connected to the ECU 5. The crank angle position sensor 11 is provided to detect a rotational angle of the crankshaft (not shown) of the engine 1, and the cam angle position sensor 12 is provided to detect a rotational angle of a camshaft to which the cams for driving the intake valves of the engine 1 are fixed. A signal corresponding to the rotational angle detected by the crank angle sensor 11, and a signal corresponding to the rotational angle detected by the cam angle position sensor 12, are supplied to the ECU 5. The crank angle position sensor 11 generates one pulse (hereinafter referred to as "CRK pulse") at every constant crank angle period (e.g., a period of 30 degrees), and a pulse for specifying a predetermined angle position of the crankshaft. The cam angle position sensor 12 generates a pulse at a predetermined crank angle position for a specific cylinder of the engine 1 (this pulse is hereinafter referred to as "CYL pulse"). The cam angle position sensor 12 further generates a pulse at top dead center (TDC), starting the intake stroke in each cylinder (this pulse is hereinafter referred to as "TDC pulse"). The pulses are used to control the various timings, such as a fuel injection timing and an ignition timing, as well as for detecting an engine rotational speed NE. An actual operating phase CAIN of the crankshaft is detected based on the correlation between the TDC pulse output from the cam angle position sensor 12 and the CRK pulse output from the crank angle position sensor 11.

An accelerator sensor 31, a vehicle speed sensor 32, and an atmospheric pressure sensor 33 are also connected to the ECU 5. The accelerator sensor 31 detects a depression amount AP of an accelerator pedal of the vehicle driven by the engine 1 (this depression amount is hereinafter referred to as "accelerator operation amount"). The vehicle speed sensor 32 detects a running speed VP (vehicle speed) of the vehicle. The atmospheric pressure sensor 33 detects an atmospheric pressure PA. The detection signals from the sensors 31-33 are supplied to the ECU 5. Further, information regarding a shift position of an automatic transmission of the vehicle having an automatic transmission, information regarding an engaging state of a clutch of the vehicle having a manual transmission, on/off, state information regarding an air-conditioner, on/off state information regarding a power steering, and on/off state information regarding electric loads, such as headlights and the like, are supplied to the ECU 5 from other control units (not shown).

The valve operating characteristic varying device 40, as shown in FIG. 2, includes a first valve operating characteristic varying mechanism 41, a second valve operating characteristic varying mechanism 42, a motor 43, and an solenoid valve 44. The first valve operating characteristic varying mechanism 41 continuously varies a lift amount (hereinafter referred to as "lift amount LFT") and an opening angle of each intake valve. The second valve operating characteristic varying mechanism 42 continuously varies an operating phase of each intake valve. The motor 43 is provided to continuously change the lift amount LFT of each intake valve. An opening of the solenoid valve 44 is continuously variable for changing the operating phase of each intake valve. The operating phase CAIN of the camshaft is used as a parameter indicative of the operating phase of the intake valve. A lubricating oil contained in an oil pan 46 is pressurized by an oil pump 45 and supplied to the solenoid valve 44. It is to be noted that a specific configuration of the second valve operating characteristic varying mechanism 42 is described, for example, in Japanese Patent Laid-open No. 2000-227013.

Figure 3A:
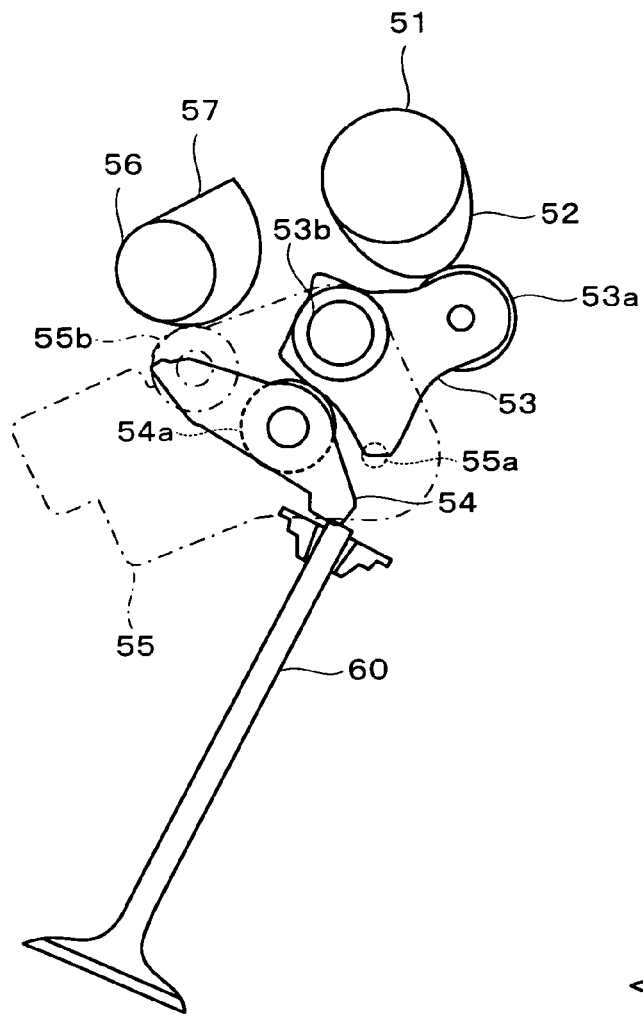
FIGS. 3A-3B are schematic diagrams of a first valve operating characteristic varying mechanism.

As shown in FIG. 3A, the first valve operating characteristic varying mechanism 41 includes a camshaft 51, a control arm 55, a control shaft 56, a sub-cam 53, and a rocker arm 54. The camshaft 51 is provided with a cam 52. The control arm 55 is supported by the cylinder head so that the control arm 55 can pivot around a shaft 55a. The control shaft 56 is provided with a control cam 57 which pivots the control arm 55. The sub-cam 53 is supported by the control arm 55 through a supporting shaft 53b so that the sub-cam 53 can pivot around the supporting shaft 53b. The sub-cam 53 is actuated by the cam 52. The rocker arm 54 is actuated by the sub-cam 53 and drives (opens and closes) an intake valve 60. The rocker arm 54 is supported in the control arm 55 so that the rocker arm 54 can pivot.

The sub-cam 53 has a roller 53a abutting the cam 52, and pivots around the shaft 53b by rotation of the camshaft 51. The rocker arm 54 has a roller 54a abutting the sub-cam 53. The movement of the sub-cam 53 is transmitted to the rocker arm 54 through the roller 54a.

Figure 3B:
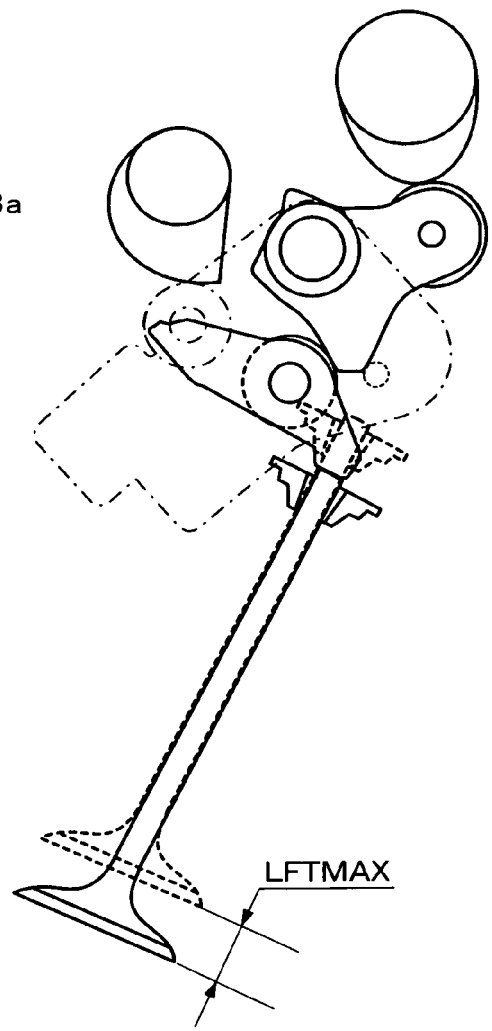

The control arm 55 has a roller 55b abutting the control cam 57, and pivots around the shaft 55a by rotation of the control shaft 56. In the state shown in FIG. 3A, the intake valve 60 maintains a substantially fully-closed state since the movement of the sub-cam 53 is not substantially transmitted to the rocker arm 54. On the other hand, in the state shown in FIG. 3B, the movement of the sub-cam 53 is transmitted to the intake valve 60 through the rocker arm 54, and the intake valve 60 opens to a maximum lift amount LFTMAX (e.g., 12 mm).

Therefore, the lift amount LFT of the intake valve 60 is continuously varied by pivoting the control shaft 56 with the motor 43. In this embodiment, the first valve operating characteristic varying mechanism 41 includes a control shaft rotational angle sensor 14 for detecting a rotational angle CSA (hereinafter referred to as "CS angle") of the control shaft 56. The detected CS angle CSA is used as a parameter indicative of the lift amount LFT.

It is to be noted that the detailed configuration of the first valve operating characteristic varying mechanism 41 is described in the specification and drawings of the patent application (Japanese Patent Application No. 200-197254), the contents of which are hereby incorporated by reference.

Figure 4A:
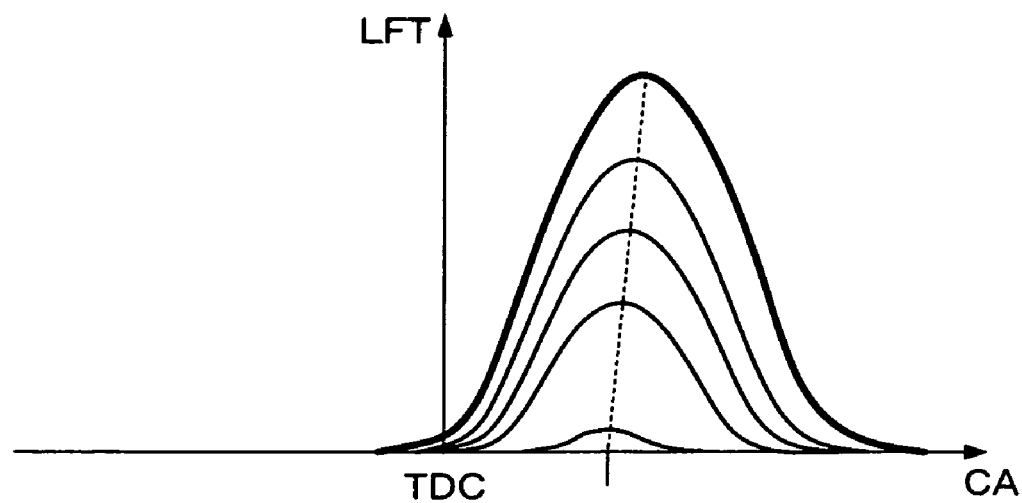
FIGS. 4A-4B are graphs illustrating valve operating characteristics.
Figure 4B:
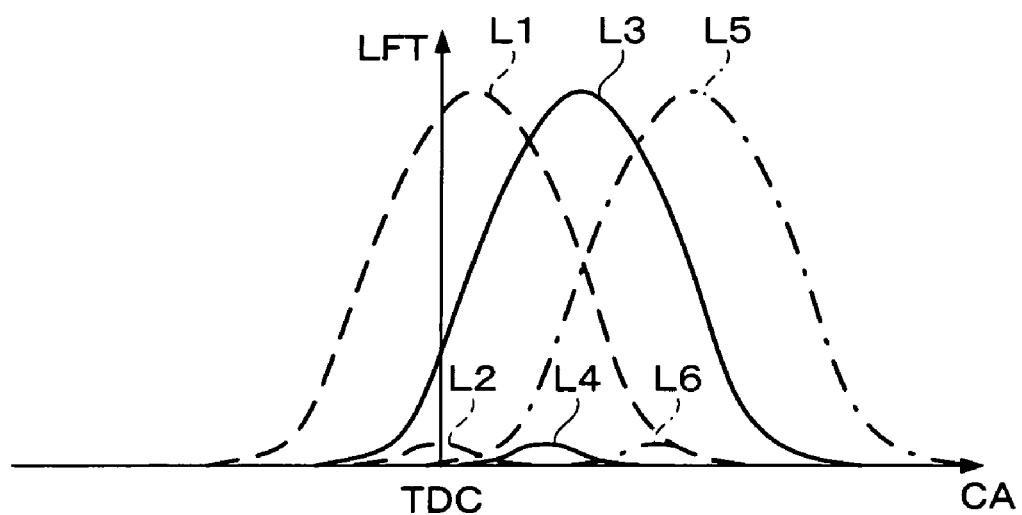

According to the first valve operating characteristic varying mechanism 41, as shown in FIG. 4A, the lift amount LFT (and the opening angle) of the intake valve is varied. Further, according to the second valve operating characteristic varying mechanism 42, the intake valve is driven with a phase from the most advanced phase, shown by the broken lines L1 and L2 in FIG. 4B to the most retarded phase, shown by the dot-and-dash lines L5 and L6 in FIG. 4B, depending on a change in the operating phase CAIN of the camshaft. In FIG. 4B, the characteristics shown by the solid lines L3 and L4 are the center of the variable phase range.

The ECU 5 includes an input circuit having various functions, including shaping the waveforms of input signals from the various sensors, correcting the voltage levels of the input signals to a predetermined level, and converting analog signal values into digital signal values. The ECU 5 further includes a central processing unit (hereinafter referred to as "CPU"), a memory circuit, and an output circuit. The memory circuit preliminarily stores various operating programs to be executed by the CPU, along with computation results or the like performed by the CPU. The output circuit supplies drive signals to the actuator 7, the fuel injection valves 6, the motor 43, and the solenoid valve 44.

The CPU in the ECU 5 controls an opening of the throttle valve 3, controls an amount of fuel to be supplied to the engine 1 (the opening period of each fuel injection valve 6), and controls the valve operating characteristic (intake air flow rate) through the motor 43 and the solenoid valve 44 according to the detected signals from the above-described sensors.

Figure 5:
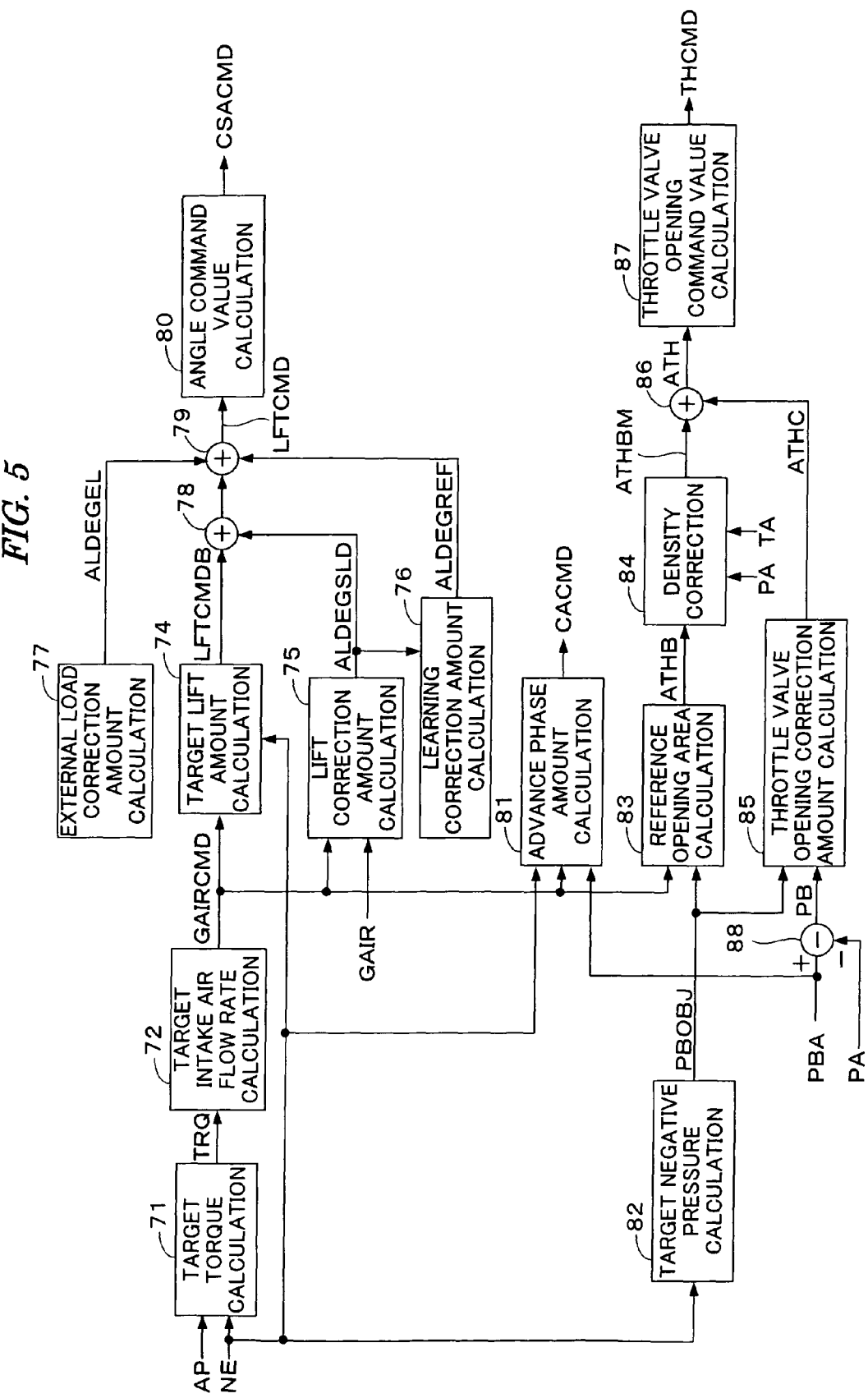
FIG. 5 is a block diagram of a module which calculates control command values of the valve operating characteristic varying device and the throttle valve.

FIG. 5 is a block diagram of an intake air control module which calculates a CS angle command value CSACMD, an operating phase command value CACMD, and a throttle valve opening command value THCMD. The CS angle command value CSACMD is a command value of the CS angle CSA, which determines the lift amount LFT of the intake valve. The operating phase command value CACMD is a command value of the operating phase CAIN of the cam 52. The throttle valve opening command value THCMD is a command value of a throttle valve opening TH. The function of the intake air control module shown in FIG. 5 is actually realized by the operation process executed by the CPU in the ECU 5. The ECU 5 outputs the drive signals to the motor 43, the solenoid valve 44, and the actuator 7 based on the calculated CS angle command value CSACMD, the operating phase command value CACMD, and the throttle valve opening command value THCMD so that the actual CS angle CSA, operating phase CAIN, and throttle valve opening TH coincide with the corresponding command values.

The intake control module includes a target torque calculation block 71, a target intake air flow rate calculation block 72, a target lift amount calculation block 74, a lift correction amount calculation block 75, a learning correction amount calculation block 76, an external load correction amount calculation block 77, adding blocks 78 and 79, an angle command value calculation block 80, an advance phase amount calculation block 81, a target negative pressure calculation block 82, a reference opening area calculation block 83, a density correction block 84, a subtracting block 88, a throttle valve opening correction amount calculation block 85, an adding block 86, and a throttle valve opening command value calculation block 87.

The target torque calculation block 71 calculates a target torque TRQ of the engine according to the accelerator operation amount AP and the engine rotational speed NE. The target torque TRQ is set to increase as the accelerator operation amount AP increases. The target intake air flow rate calculation block 72 calculates a target intake air flow rate GAIRCMD according to the target torque TRQ.

The target lift amount calculation block 74 calculates a basic target lift amount LFTCMDB of the intake valve according to the target intake air flow rate GAIRCMD and the engine rotational speed NE. It is to be noted that in the idling condition of the engine, the basic target lift amount LFTCMDB is calculated according to a target rotational speed NOBJ set for idling instead of the detected engine rotational speed NE. In operating conditions other than the idling condition, the basic target lift amount LFTCMDB is set to increase as the engine rotational speed NE increases and is set to increase as the target intake air flow rate GAIRCMD increases. Further in the idling condition, the basic target lift amount LFTCMDB is set to increase as the target rotational speed NOBJ increases and is set to increase as the target intake air flow rate GAIRCMD increases.

In the idling condition of the engine, the lift correction amount calculation block 75 calculates a lift correction amount ALDEGSLD so that the detected intake air flow rate GAIR coincides with the target intake air flow rate GAIRCMD. The learning correction amount calculation block 76 calculates a learning correction amount ALDEGREF by averaging the lift correction amount ALDEGSLD. Further, the external load correction amount calculation block 77 calculates an external load correction amount ALDEGEL applied when at least one of the external loads, i.e., a load of actuating the power steering, a load of driving the compressor of the air-conditioner and the like, is applied.

The adding blocks 78 and 79 perform the calculation expressed by equation (1). That is, the basic target lift amount LFTCMDB is corrected by correction amounts ALDEGSLD, ALDEGREF, and ALDEGEL, to calculate a target lift amount LFTCMD.

$$LFTCMD = LFTCMDB + ALDEGSLD + ALDEGREF + ALDEGEL \quad (1)$$

Figure 6A:
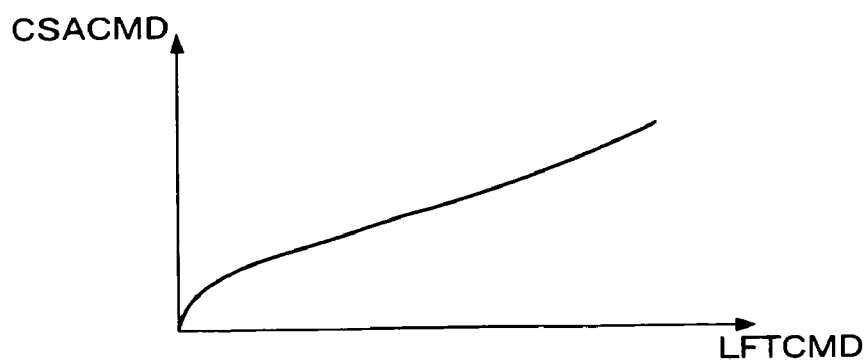
FIGS. 6A and 6B show tables referred to in operations of the blocks shown in FIG. 5.

The angle command value calculation block 80 retrieves a CSACMD table, shown in FIG. 6A according to the target lift amount LFTCMD, to calculate the CS angle command value CSACMD.

The advance phase amount calculation block 81 calculates an advance phase amount of the intake valve operating phase according to the target intake air flow rate GAIRCMD, the engine rotational speed NE and the intake pressure PBA, to output a calculated result as the operating phase command value CACMD.

The target negative pressure calculation block 82 calculates a target negative pressure PBOBJ (<0) according to the engine rotational speed NE. The target negative pressure PBOBJ is a target value of a pressure difference (PBA−PA) between the intake pressure PBA and the atmospheric pressure PA. The target negative pressure PBOBJ is set so that the absolute value of the target negative pressure PBOBJ decreases as the engine rotational speed NE increases. Alternatively, the target negative pressure PBOBJ may be set to a constant value regardless of the engine rotational speed NE. The reference opening area calculation block 83 calculates a reference opening area ATHB of the throttle valve 3 according to the target negative pressure PBOBJ. The reference opening area ATHB is set to decrease as the absolute value of the target negative pressure PBOBJ increases.

The density correction block 84 performs a density correction of the reference opening area ATHB according to the atmospheric pressure PA and the intake air temperature TA to calculate a corrected reference opening area ATHBM. The reference opening area ATHB is corrected to increase as the atmospheric pressure PA decreases or the intake air temperature TA increases.

Figure 6B:
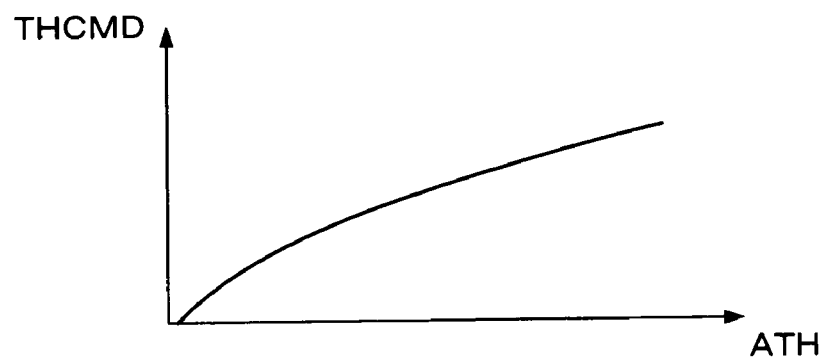

The subtracting block 88 subtracts the atmospheric pressure PA from the intake pressure PBA to calculate an intake negative pressure PB. The throttle valve opening correction amount calculation block 85 calculates an area correction amount ATHC so that the intake negative pressure PB coincides with the target negative pressure PBOBJ. The adding block 86 adds the area correction amount ATHC to the corrected reference opening area ATHBM to calculate the opening area ATH. The throttle valve opening command value calculation block 87 retrieves a THCMD table, shown in FIG. 6B according to the opening area ATH, to calculate the throttle valve opening command value THCMD.

The throttle valve opening TH is controlled by blocks 82 to 88 so that the intake negative pressure PB coincides with the target negative pressure PBOBJ. Therefore, in the idling condition of the engine, for example, the intake negative pressure PB is maintained at the constant target negative pressure PBOBJ.

Figure 7:
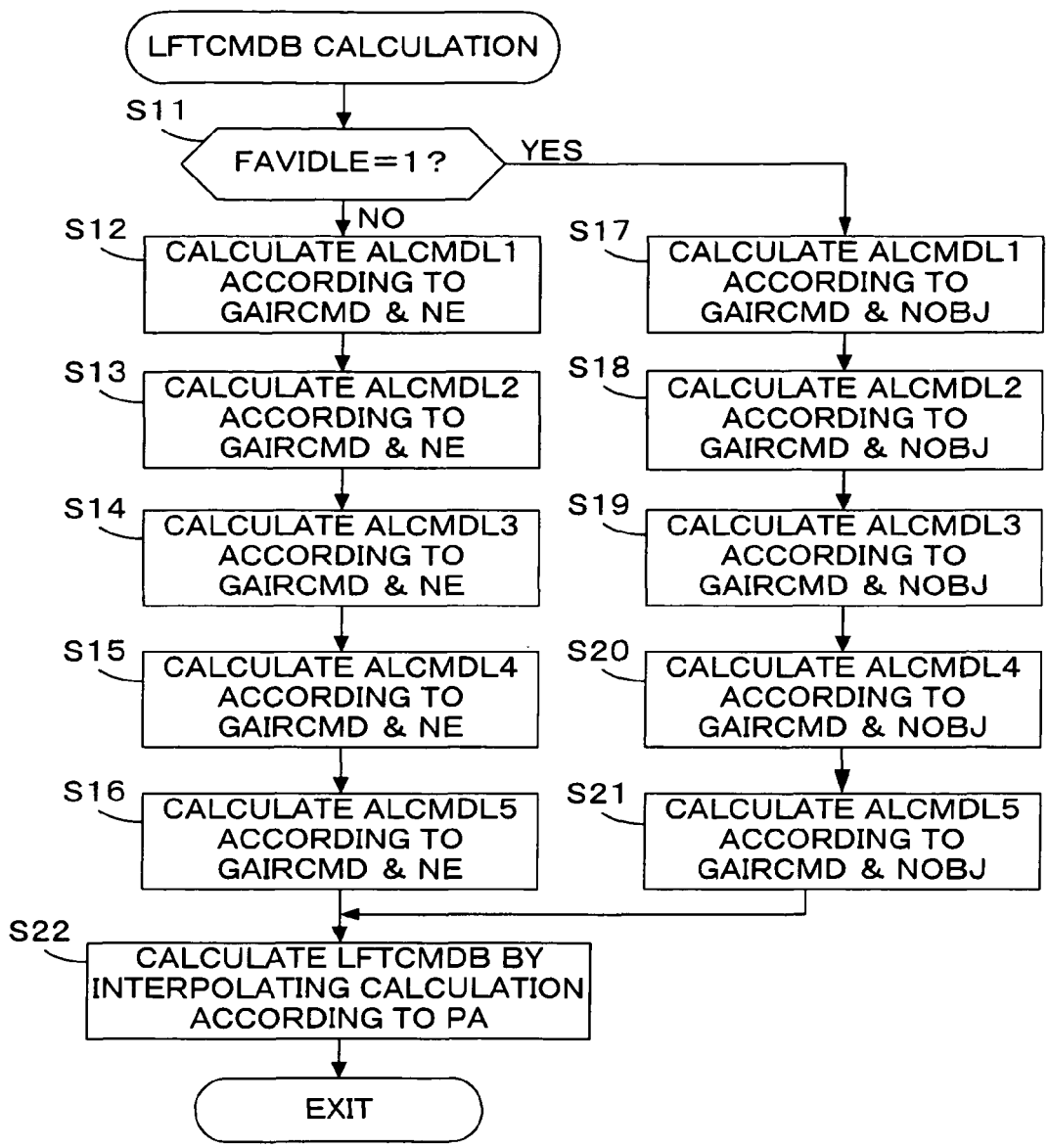
FIG. 7 is a flowchart of a calculation process executed in a target lift amount calculation block shown in FIG. 5.

FIG. 7 is a flowchart of a calculation process executed in the target lift amount calculation block 74 shown in FIG. 5. The calculation process is executed at predetermined time intervals (e.g., 10 milliseconds). It is to be noted that the processes shown in other flowcharts described below are similarly executed at predetermined time intervals (e.g., 10 milliseconds).

In step S11, it is determined whether an idle flag FAVIDLE is equal to "1". The idle flag FAVIDLE is set to "1" when the vehicle speed VP is equal to or less than a predetermined vehicle speed VPIDL (e.g., 3 km/h), and the accelerator operation amount AP is equal to "0".

If the answer to step S11 is negative (NO), i.e., if the engine 1 is not in the idling condition (the engine 1 is in a normal operating condition), a first normal lift amount map is retrieved according to the target intake air flow rate GAIRCMD and the engine rotational speed NE to calculate a first lift amount map value ALCMDL1 (step S12). The first normal lift amount map is set to correspond to a state where the atmospheric pressure PA is equal to a first value PA1 (e.g., 101 kPa (760 mmHg)).

In step S13, a second normal lift amount map is retrieved according to the target intake air flow rate GAIRCMD and the engine rotational speed NE to calculate a second lift amount map value ALCMDL2. The second normal lift amount map is set to correspond to a state where the atmospheric pressure PA is equal to a second value PA2 (e.g., 94.6 kPa (710 mmHg)).

In step S14, a third normal lift amount map is retrieved according to the target intake air flow rate GAIRCMD and the engine rotational speed NE to calculate a third lift amount map value ALCMDL3. The third normal lift amount map is set to correspond to a state where the atmospheric pressure PA is equal to a third value PA3 (e.g., 80 kPa (600 mmHg)).

In step S15, a fourth normal lift amount map is retrieved according to the target intake air flow rate GAIRCMD and the engine rotational speed NE to calculate a fourth lift amount map value ALCMDL4. The fourth normal lift amount map is set to correspond to a state where the atmospheric pressure PA is equal to a fourth value PA4 (e.g., 66.7 kPa (500 mmHg)).

In step S16, the fifth normal lift amount map is retrieved according to the target intake air flow rate GAIRCMD and the engine rotational speed NE to calculate a fifth lift amount map value ALCMDL5. The fifth normal lift amount map is set to correspond to a state where the atmospheric pressure PA is equal to a fifth value PA5 (e.g., 53.3 kPa (400 mmHg)).

In step S22, it is determined which range the detected atmospheric pressure PA is in among the ranges defined by the first to fifth values PA1 to PA5, and the basic target lift amount LFTCMDB is calculated by performing an interpolating calculation. For example, if the atmospheric pressure PA is between the first value PA1 and the second value PA2, the basic target lift amount LFTCMDB is calculated by equation (2).

$$LFTCMDB = \\ (ALCMDL2 - ALCMDL1) \times (PA - PA1)/(PA2 - PA1) + \\ ALCMDL1 \quad (2)$$

If the answer to step S11 is affirmative (YES), i.e., if the engine 1 is in the idling condition, a first idle lift amount map is retrieved according to the target intake air flow rate GAIRCMD and the target rotational speed NOBJ in the idling condition to calculate a first lift amount map value ALCMDL1 (step S17). The first idle lift amount map is set to correspond to a state where the atmospheric pressure PA is equal to the first value PA1.

In step S18, a second idle lift amount map is retrieved according to the target intake air flow rate GAIRCMD and the target rotational speed NOBJ to calculate a second lift amount map value ALCMDL2. The second idle lift amount map is set to correspond to a state where the atmospheric pressure PA is equal to the second value PA2.

In step S19, a third idle lift amount map is retrieved according to the target intake air flow rate GAIRCMD and the target rotational speed NOBJ to calculate a third lift amount map value ALCMDL3. The third idle lift amount map is set to correspond to a state where the atmospheric pressure PA is equal to the third value PA3.

In step S20, a fourth idle lift amount map is retrieved according to the target intake air flow rate GAIRCMD and the target rotational speed NOBJ to calculate a fourth lift amount map value ALCMDL4. The fourth idle lift amount map is set to correspond to a state where the atmospheric pressure PA is equal to the fourth value PA4.

In step S21, a fifth idle lift amount map is retrieved according to the target intake air flow rate GAIRCMD and the target rotational speed NOBJ to calculate a fifth lift amount map value ALCMDL5. The fifth idle lift amount map is set to correspond to a state where the atmospheric pressure PA is equal to the fifth value PA5.

After execution of step S21, the process proceeds to step S22 described above.

As described above, according to the process of FIG. 7, when the engine 1 is in an operating condition other than the idling condition, the basic target lift amount LFTCMDB is set according to the target intake air flow rate GAIRCMD and the engine rotational speed NE. On the other hand, when the engine 1 is in the idling condition, the basic target lift amount LFTCMDB is set according to the target intake air flow rate GAIRCMD and the target rotational speed NOBJ. In the idling condition, if the basic target lift amount LFTCMDB is set according to the engine rotational speed NE, the lift amount of the intake valve fluctuates when the engine rotation becomes unstable, which may sometimes make the engine rotation more unstable. Therefore, in this embodiment, the basic target lift amount LFTCMDB is set according to the target rotational speed NOBJ, wherein a stable engine rotation is maintained.

Figure 10:
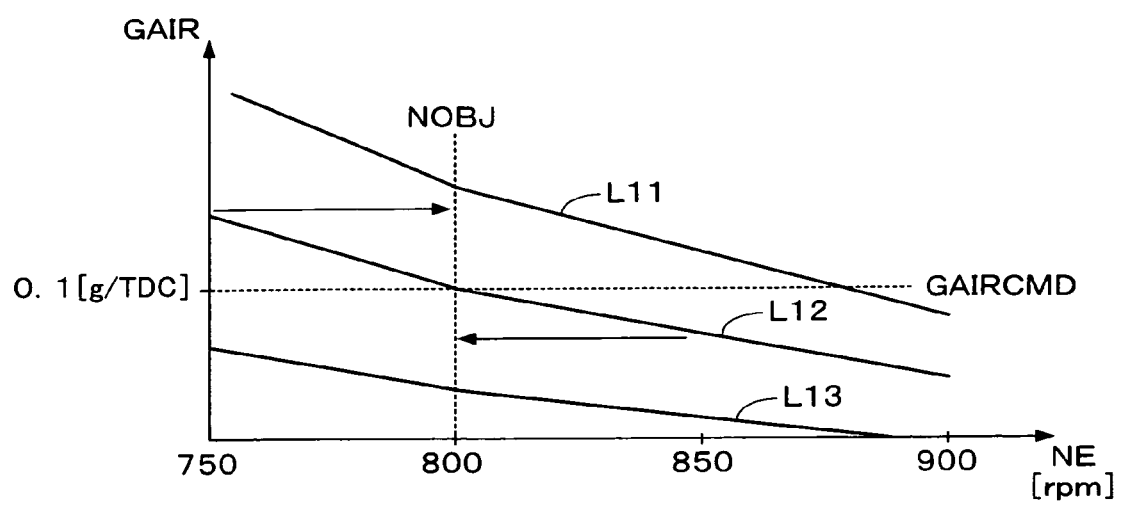
FIG. 10 is a graph illustrating the relationship between the engine rotational speed and the intake air flow rate.

FIG. 10 is a graph showing a relationship between the engine rotational speed NE and the intake air flow rate GAIR. The lines L11 to L13 of FIG. 10, respectively, show the relationships corresponding to the lift amount LFT of the intake valve of 0.8 mm, 0.6 mm, and 0.3 mm. For example, in a case where the target intake air flow rate GAIRCMD is equal to 0.1 (g/TDC) and the target rotational speed NOBJ is equal to 800 rpm, if the engine rotational speed NE decreases to 750 rpm due to any cause, the lift amount LFT is maintained at 0.6 mm, since the basic target lift amount LFTCMDB is calculated according to the target rotational speed NOBJ in this embodiment.

Further, the throttle valve opening TH is controlled so that the intake negative pressure PB becomes equal to the target negative pressure PBOBJ, and a time period during which the intake valve opens increases due to the decrease in the engine rotational speed NE. Consequently, the intake air flow rate GAIR increases to make the engine rotational speed NE shift to the target rotational speed NOBJ, even if the lift amount LFT is maintained at 0.6 mm.

On the other hand, if the engine rotational speed NE increases to 850 rpm due to any cause, a time period during which the intake valve opens decreases. Consequently, the intake air flow rate GAIR decreases to make the engine rotational speed NE shift to the target rotational speed NOBJ, even if the lift amount LFT is maintained at 0.6 mm.

In contrast, in the case where the lift amount command value is calculated according to the detected engine rotational speed NE and the target intake air flow rate GAIRCMD is substantially constant, if the engine rotational speed NE decreases, the lift amount LFT is controlled to decrease, which reduces the engine rotational speed NE further.

Conversely, if the engine rotational speed NE increases, the lift amount LFT is controlled to increase, which makes the engine rotational speed NE increase further. Accordingly, idling rotational speed control becomes extremely difficult to perform. According to this embodiment, the engine rotational speed NE is stable and maintained at the target rotational speed NOBJ without such a problem occurring.

In this embodiment, the lift correction amount ALDEGSLD is calculated by the lift correction amount calculation block 75, shown in FIG. 5, so that the detected intake air flow rate GAIR coincides with the target intake air flow rate GAIRCMD, thereby performing a feedback control of the intake air flow rate GAIR. However, the feedback control does not affect a change in the intake air flow rate when the engine rotational speed NE converges on the target rotational speed NOBJ, since a control speed of the feedback control of GAIR is set to a very low speed compared with the speed at which the engine rotational speed NE autoregressively converges on the target rotational speed NOBJ, as described above. That is, the feedback control by the lift correction amount calculation block 75 is a very low speed control for maintaining the intake air flow rate GAIR at the target intake air flow rate GAIRCMD, and the engine rotational speed NE converges on the target rotational speed NOBJ even if the feedback control is not performed.

Figure 8:
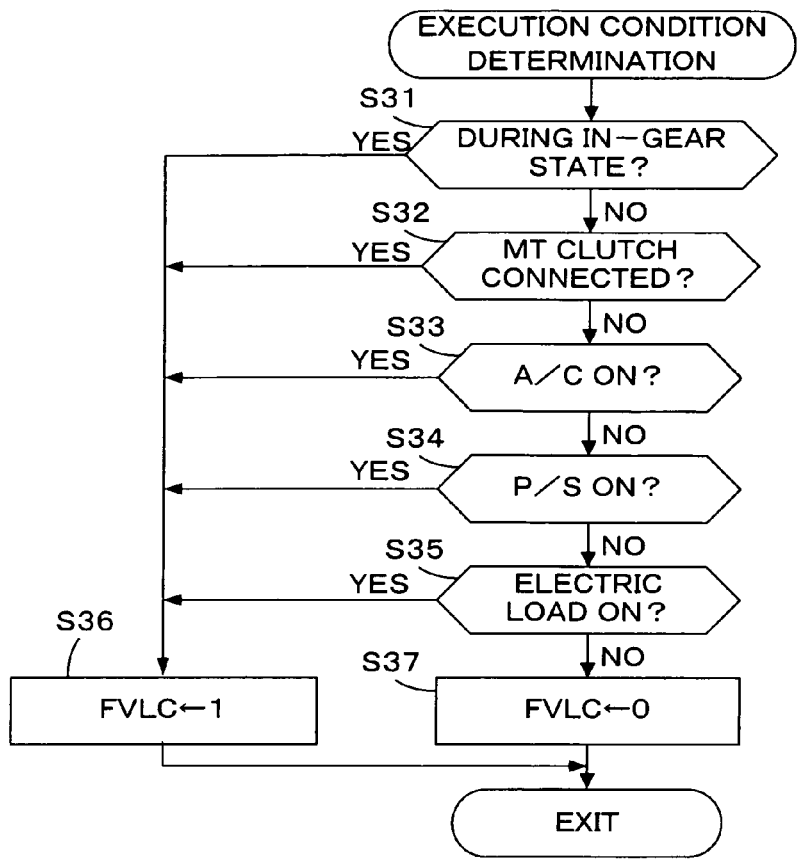
FIG. 8 is a flowchart of a calculation process executed in an external load correction amount calculation block shown in FIG. 5.

FIG. 8 is a flowchart of a process for determining an execution condition of an external load correction in the external load correction amount calculation block 77 of FIG. 5.

In step S31, it is determined whether the vehicle is provided with an automatic transmission and the automatic transmission is in an in-gear state, i.e., when a range other than N-range (neutral range) or P-range (parking range), is selected. If the answer to step S31 is negative (NO), it is determined whether the vehicle is provided with a manual transmission and a clutch for transmitting the engine output to the transmission is engaged (step S32). If the answer to step S32 is negative (NO), it is determined whether the air-conditioner is operating (step S33). If the answer to step S33 is negative (NO), it is determined whether power steering is in operation (step S34). If the answer to step S34 is negative (NO), it is determined whether at least one large electric load is applied (step S35).

If the answer to any one of steps S31 to S35 is affirmative (YES), an external load correction execution flag FVLC is set to "1" (step S36). On the other hand, if all of the answers to steps S31 to S35 are negative (NO), the external load correction execution flag FVLC is set to "0" (step S37).

Figure 9:
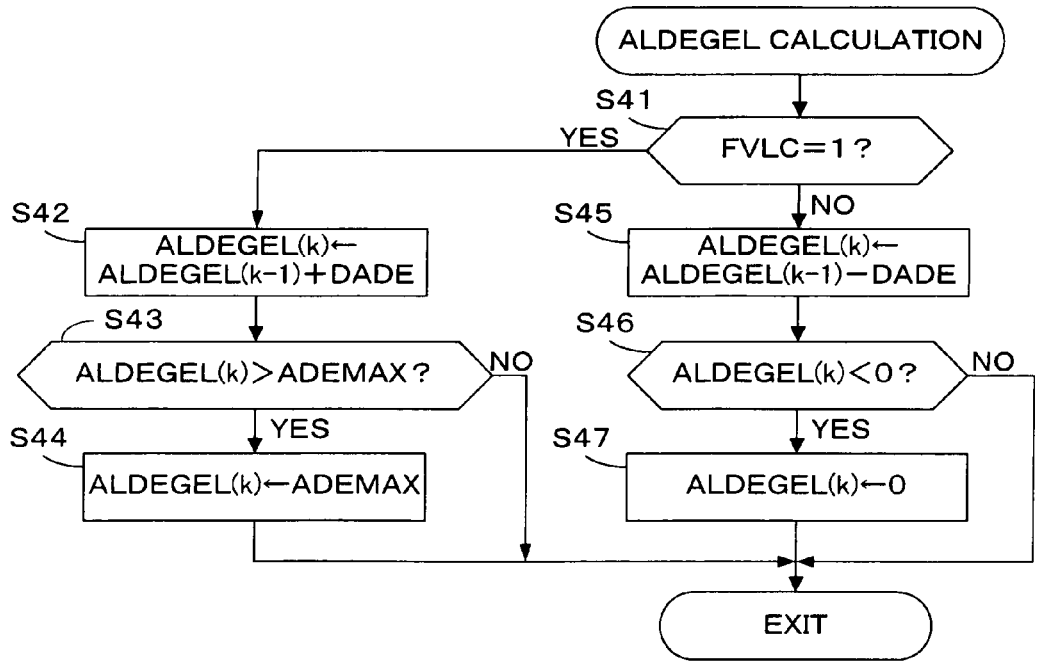
FIG. 9 is a flowchart of a calculation process executed in an external load correction amount calculation block shown in FIG. 5.

FIG. 9 is a flowchart of a process for calculating the external load correction amount ALDEGEL in the external load correction amount calculation block 77 of FIG. 5.

In step S41, it is determined whether the external load correction execution flag FVLC is equal to "1". If FVLC is equal to "1", the external load correction amount ALDEGEL is calculated by equation (3) (step S42).

$$ALDEGEL(k)=ALDEGEL(k-1)+DADE \qquad (3)$$

In equation (3), "(k)" and "(k−1)" are, respectively, attached in order to indicate a present value and a preceding value. Further, "DADE" is a predetermined updating value, which is a parameter for gradually changing the external load correction amount ALDEGEL.

In step S43, it is determined whether the calculated external load correction amount ALDEGEL is greater than a maximum value ADEMAX. If the answer to step S43 is affirmative (YES), the external load correction amount ALDEGEL is set to the maximum value ADEMAX (step S44). If ALDEGEL is equal to or less than ADEMAX, the process immediately ends.

According to steps S42 to S44, when the external load correction execution flag FVLC is equal to "1", the external load correction amount ALDEGEL is set to gradually increase until reaching the maximum value ADEMAX.

In step S41, if FVLC is equal to "0", the external load correction amount ALDEGEL is calculated by equation (4) (step S45).

$$ALDEGEL(k) = ALDEGEL(k-1) - DADE \quad (4)$$

In step S46, it is determined whether the calculated external load correction amount ALDEGEL is a negative value. If the answer to step S46 is affirmative (YES), the external load correction amount ALDEGEL is set to "0" (step S47). If ALDEGEL is greater than "0", the process immediately ends.

According to steps S45 to S47, when the external load correction execution flag FVLC is equal to "0", the external load correction amount ALDEGEL is set to gradually decrease until reaching "0".

According to the process of FIG. 9, when the execution condition of the external load correction has shifted from a dissatisfied state to a satisfied state, or vice versa, the external load correction amount ALDEGEL increases to the maximum value ADEMAX, or decreases to "0" with a change rate limited by the predetermined updating value DADE. Therefore, the intake air amount is prevented from rapidly changing upon starting and ending the external load correction, thereby stabilizing the engine rotation.

In this embodiment, the ECU 5 constitutes the idling condition determining means, the target intake air flow rate calculating means, the lift amount command value calculating means, a part of the lift amount control means, and the external load detecting means. Specifically, step S11 of FIG. 7 corresponds to the idling condition determining means. The target intake air flow rate calculation block 72 of FIG. 5 corresponds to the target intake air flow rate calculating means. The target lift amount calculation block 74, the external load correction amount calculation block 77, and the adding blocks 78 and 79 correspond to the lift amount command value calculating means. The angle command value calculation block 80 and the motor 43 correspond to the lift amount control means. The process of FIG. 8 corresponds to the external load detecting means.

The present invention is not limited to the embodiment described above, and various modifications may be made thereto. For example, the first and second valve operating characteristic varying mechanisms are not limited to the above-described mechanisms. The mechanism shown in JP'793, described above, may be used therein.

The present invention may be applied to an intake air control for a watercraft propulsion engine, such as an outboard engine, having a vertically extending crankshaft.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An intake air control system for an internal combustion engine comprising at least one intake valve and a valve operating characteristic varying mechanism which continuously varies a lift amount of said at least one intake valve, said intake air control system comprising:

idling condition determining means for determining an idling condition of said engine;

target intake air flow rate calculating means for calculating a target intake air flow rate of said engine;

lift amount command value calculating means for calculating a command value of the lift amount of said at least one intake valve according to a target engine rotational speed set in the idling condition of said engine and the target intake air flow rate when said engine is determined to be in the idling condition;

lift amount control means for controlling said valve operating characteristic varying mechanism according to the calculated lift amount command value; and external load detecting means for detecting an application and a removal of an external load on said engine, wherein said lift amount command value calculating means increases or decreases the lift amount command value with a limited rate of change in the lift amount command value when the application or the removal of the external load is detected.

2. An intake air control method for an internal combustion engine comprising at least one intake valve and a valve operating characteristic varying mechanism which continuously varies a lift amount of said at least one intake valve, said intake air control method comprising:

determining an idling condition of said engine;

calculating a target intake air flow rate of said engine;

calculating a command value of the lift amount of said at least one intake valve according to a target engine rotational speed set in the idling condition of said engine and the target intake air flow rate when said engine is determined to be in the idling condition;

controlling said valve operating characteristic varying mechanism according to the calculated lift amount command value; and detecting an application and a removal of an external load on said engine, wherein the lift amount command value is increased or decreased with a limited rate of change in the lift amount command value when the application or the removal of the external load is detected.

3. A computer program embodied on a computer-readable medium for causing a computer to implement an intake air control method for an internal combustion engine comprising at least one intake valve and a valve operating characteristic varying mechanism which continuously varies a lift amount of said at least one intake valve, said intake air control method comprising:

determining an idling condition of said engine;

calculating a target intake air flow rate of said engine;

calculating a command value of the lift amount of said at least one intake valve according to a target engine rotational speed set in the idling condition of said engine and the target intake air flow rate when said engine is determined to be in the idling condition;

controlling said valve operating characteristic varying mechanism according to the calculated lift amount command value; and detecting an application and a removal of an external load on said engine, wherein the lift amount command value is increased or decreased with a limited rate of change in the lift amount command value when the application or the removal of the external load is detected.

* * * * *